(12) United States Patent
Levow (10) Patent No.: US 8,788,597 B2
(45) Date of Patent: Jul. 22, 2014

(54) RECALLING SPAM EMAIL OR VIRUSES FROM INBOXES

(75) Inventor: Zachary Levow, Mountain View, CA (US)

(73) Assignee: Barracuda Networks, Inc., Campbell, CA (US)

( * ) Notice: Subject to any disclaimer, the term of this patent is extended or adjusted under 35 U.S.C. 154(b) by 922 days.

(21) Appl. No.: 12/409,504

(22) Filed: Mar. 24, 2009

(65) Prior Publication Data

US 2010/0250579 A1    Sep. 30, 2010

(51) Int. Cl.
*G06F 15/16* (2006.01)

(52) U.S. Cl.
USPC .......................................... 709/206; 709/205

(58) Field of Classification Search
USPC .................................................. 709/205, 206
See application file for complete search history.

(56) References Cited

U.S. PATENT DOCUMENTS

2006/0010209 A1 *   1/2006   Hodgson ..................... 709/206

\* cited by examiner

*Primary Examiner* — Adnan Mirza
(74) *Attorney, Agent, or Firm* — Duane Morris LLP (57) ABSTRACT

A method for operating an apparatus to recall email which has already passed through a spam filter to user mailboxes. An apparatus stores a highly efficient database for a brief period of time after an email is received, filtered, and transmitted to an email server. Message id, recipient, connecting IP address and other spam attributes are stored in a searchable format. After receiving updated spam attributes, a spam filter apparatus under software control queries the database for messages that were not detected as spam before transmittal to the email clients and servers, and sends spam recall messages. Improved email clients and servers adapted by software instructions, move or modify email user mailboxes upon receipt of the spam recall.

7 Claims, 13 Drawing Sheets

FIG.13

RECALLING SPAM EMAIL OR VIRUSES FROM INBOXES

BACKGROUND

Figure 1:
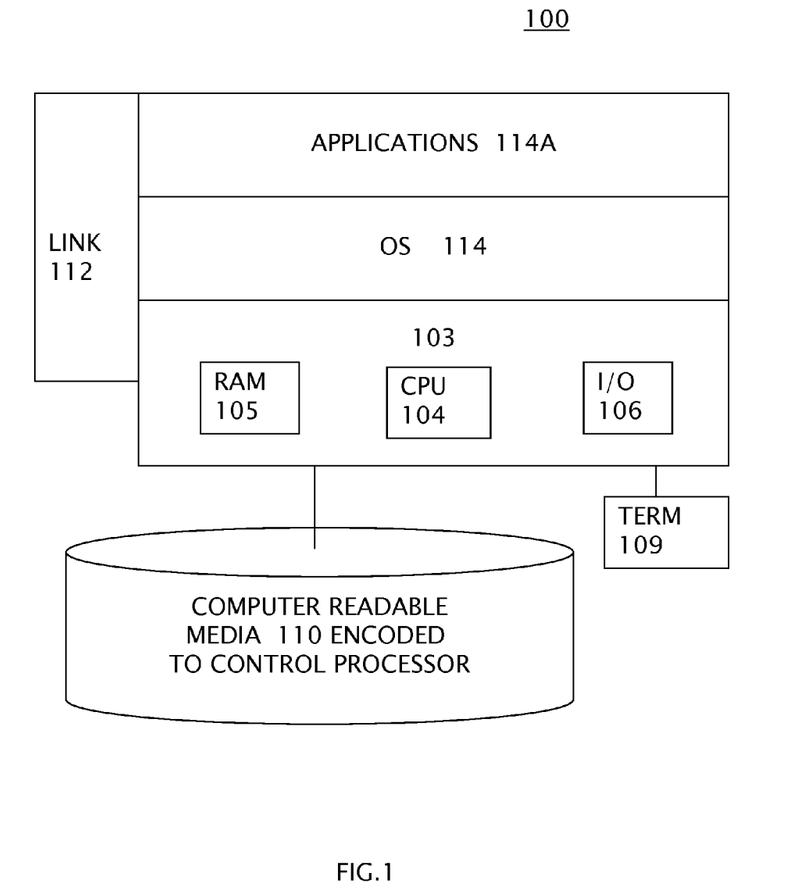
FIG. 1 shows a block diagram of a typical computing system.

It is known that conventional spam and virus filters can block email from entering a network based on spam attributes. It is known that conventional email systems can recall email sent from one client to a second client of the same server. Referring now to the figures, it is known that circuits may be embodied as processors controlled by software encoded on computer readable media. FIG. 1 illustrates a non-limiting exemplary processor adapted to perform the operation of circuits described below.

Figure 2:
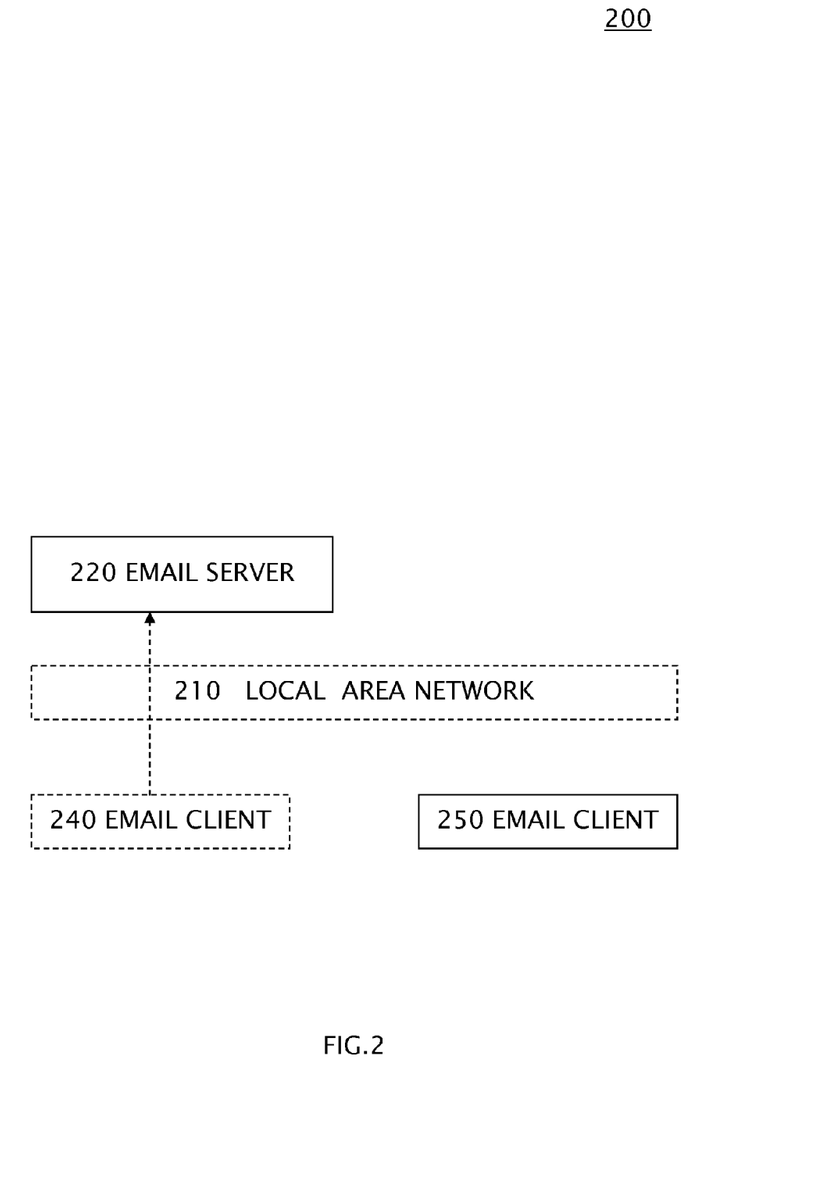
FIG. 2 shows a block diagram of a conventional email system.

FIG. 2 is a block diagram illustration of elements in a conventional email system. FIG. 2 shows an email client 240 coupled to a local area network 210 which connects the email client to an email server 220. Email client 240 sends an email addressed to a recipient at email client 250.

Figure 3:
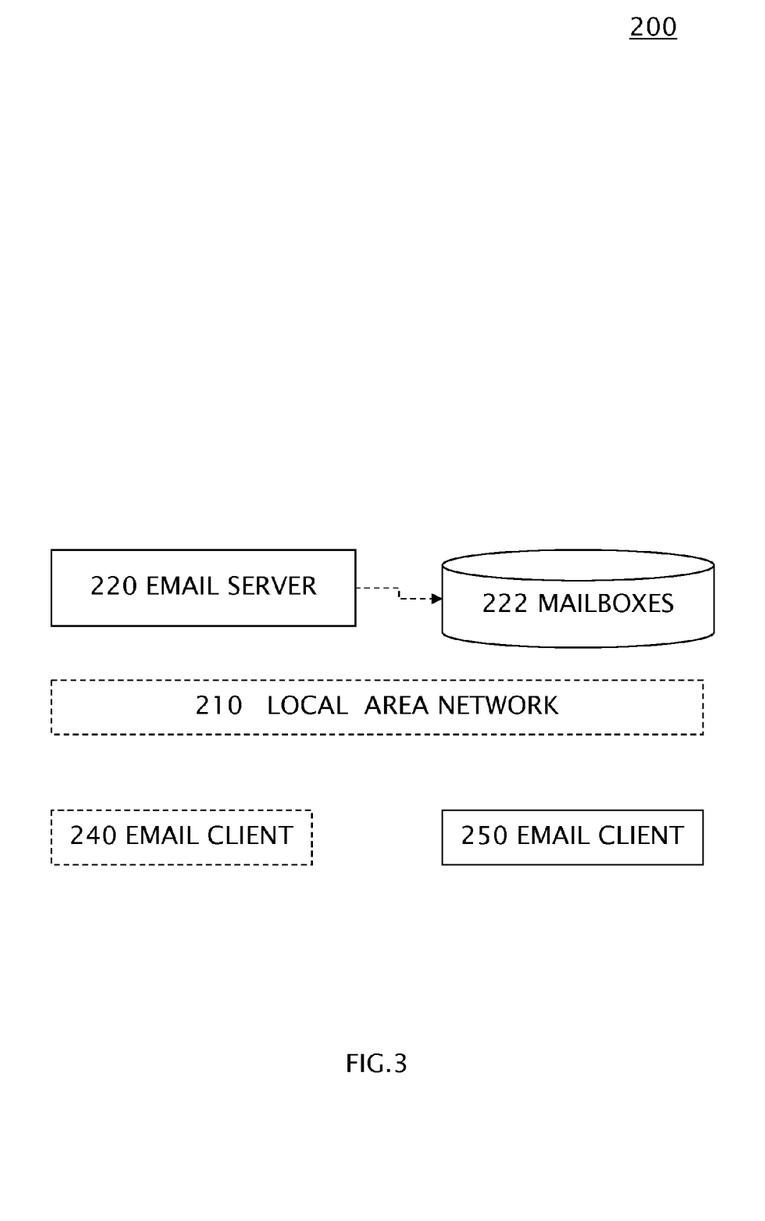
FIG. 3 shows a block diagram of a conventional email system.

FIG. 3 is a block diagram illustration of one embodiment of a conventional email system. FIG. 3 shows mailboxes 222 coupled to email server 220. Each email for email client 250 is stored into an email store attached to the email server. When a client reads mail it will access its mailboxes through the local area network.

Figure 4:
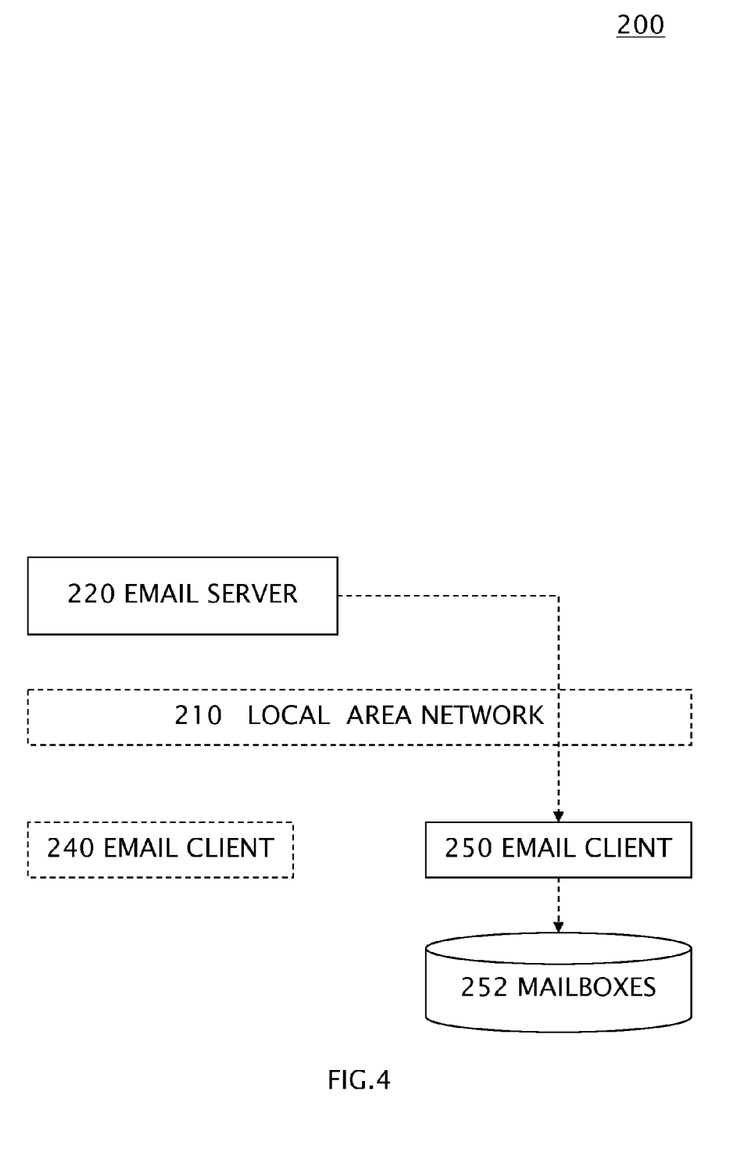
FIG. 4 shows a block diagram of a conventional email system.

FIG. 4 is a block diagram illustration of another embodiment of a conventional email system. FIG. 4 shows email client 250 coupled to a local store for mailboxes 252. In an embodiment, email server 220 pushes email to email client 250 and stores into email client 250's mailboxes 252.

Figure 5:
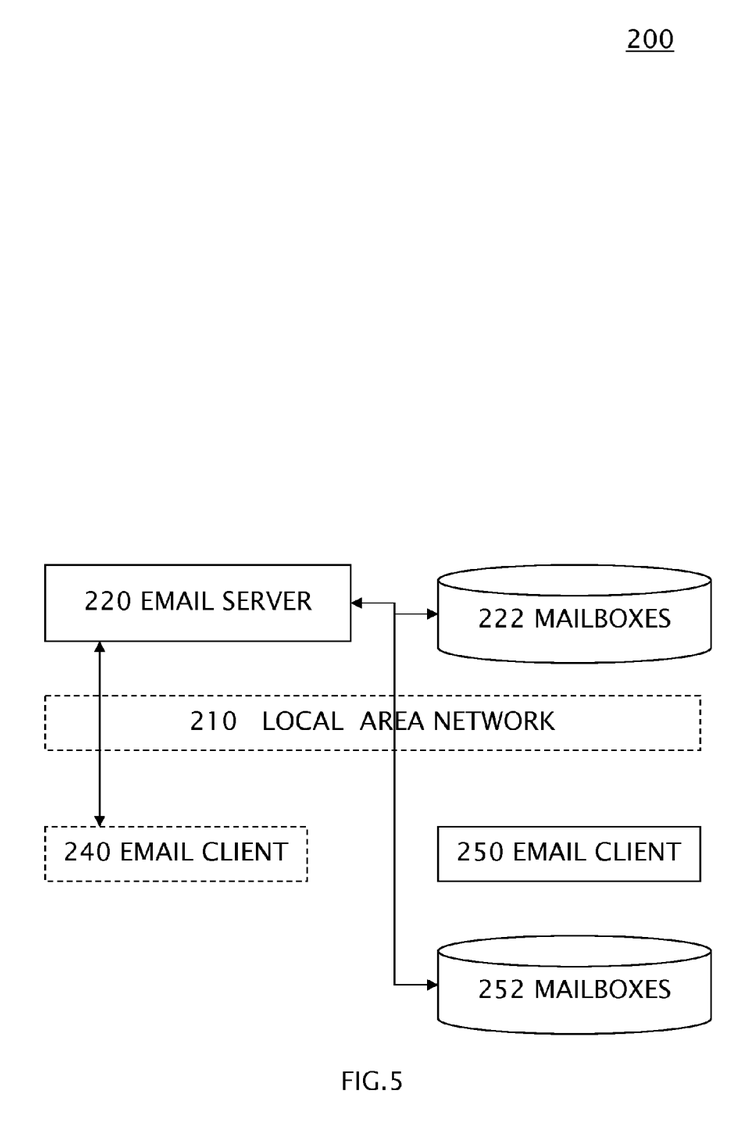
FIG. 5 shows a block diagram of a conventional email system.

FIG. 5 is a block diagram illustration of a hybrid embodiment of a conventional email system. FIG. 5 shows both an email server attached store for mailboxes 222 as well as a client attached store for mailboxes 252. In an embodiment, mail is stored in duplicate at both the email server and at the email client. Also it is known that an email client may recall a email sent to another client on the same conventional email server.

Figure 6:
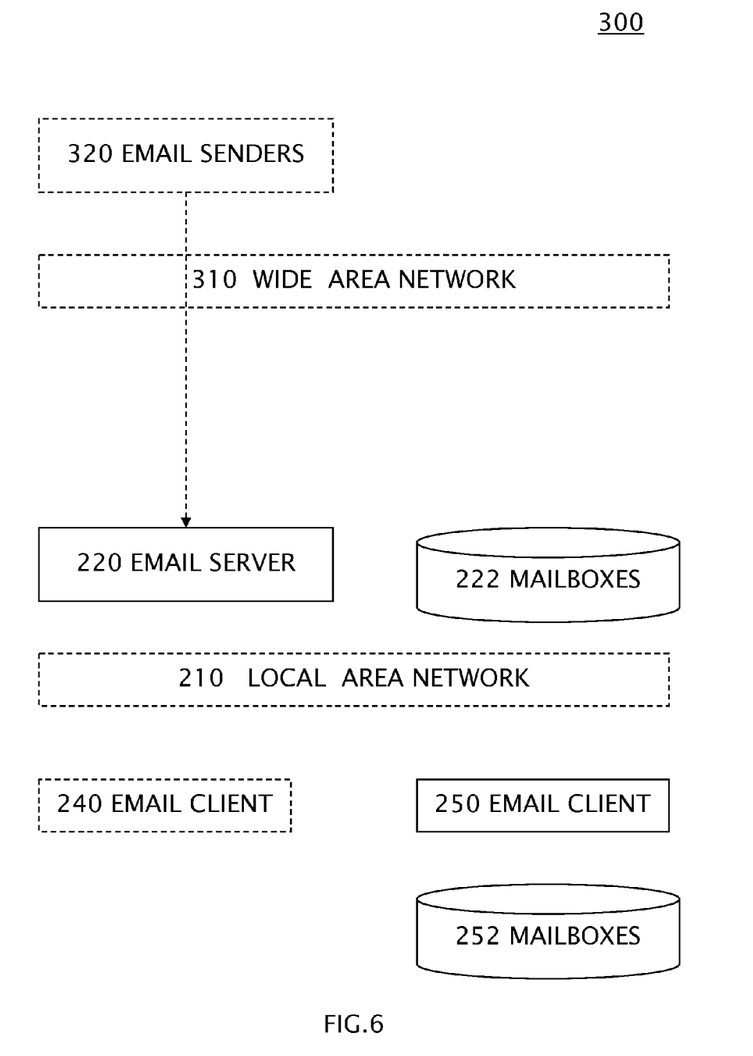
FIG. 6 shows a block diagram of a conventional email system.

FIG. 6 is a block diagram illustration of a conventional email system attached to a wide area network 310 such as the Internet. Email senders 320 coupled to the wide area network 310 may send email to email clients 240 and 250 through email server 220. Such emails are not recallable. Such emails frequently include undesirable emails called spam.

Figure 7:
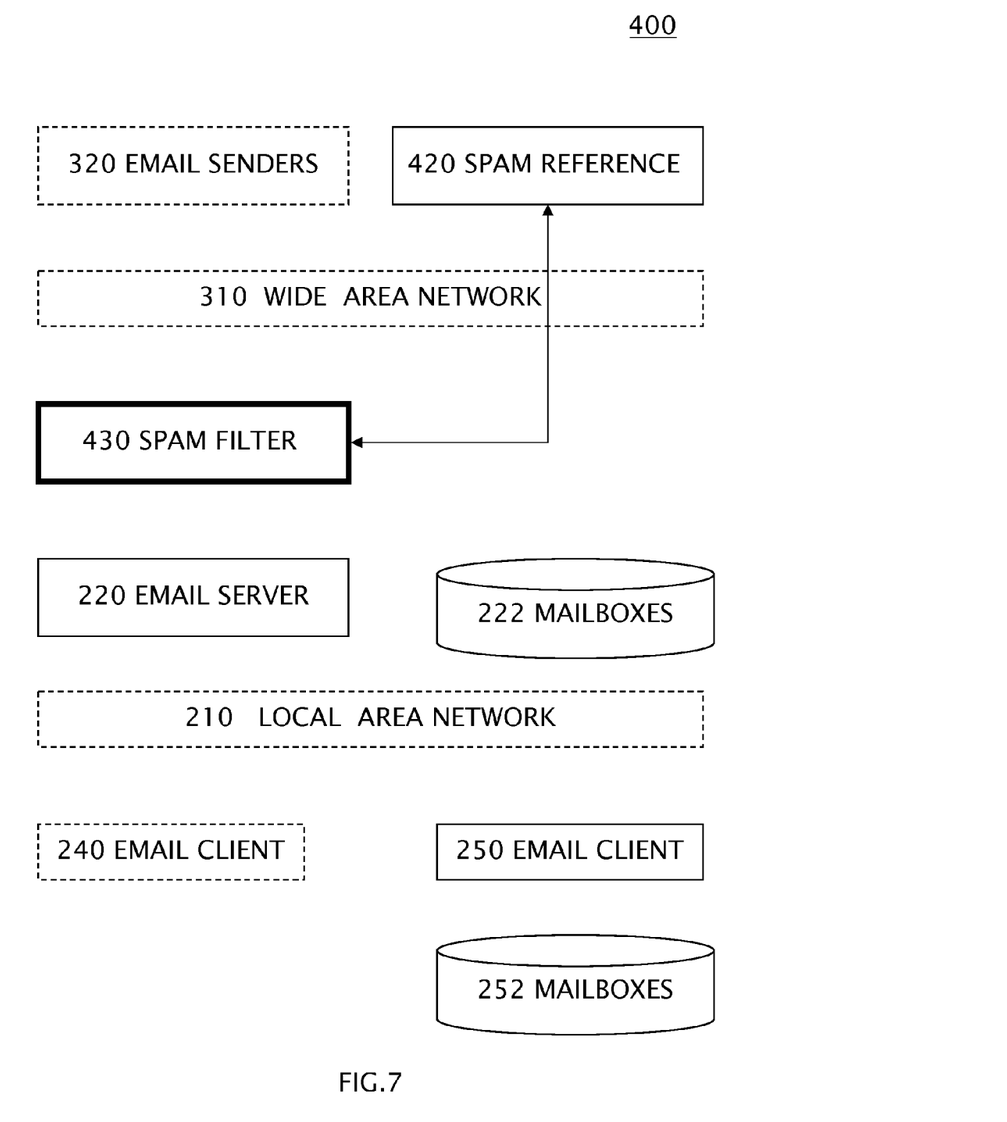
FIG. 7 shows a block diagram of a spam filter and a conventional email system.

FIG. 7 is a block diagram illustration of a conventional email system with an anti-spam appliance installed. In FIG. 7, a spam filter 430 connects to an external spam reference library 420 to request an update to its anti-spam software.

Figure 8:
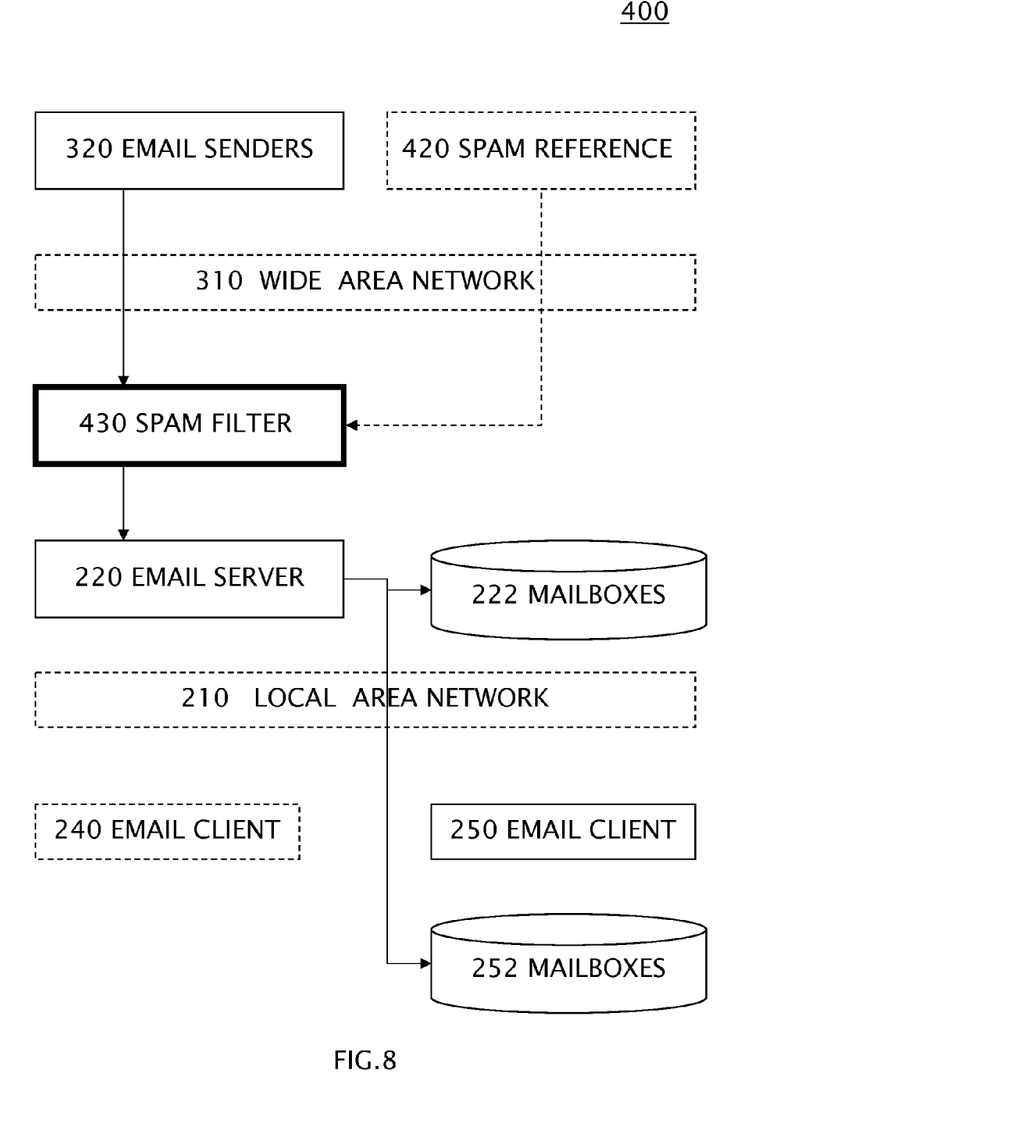
FIG. 8 shows a block diagram of a spam filter and a conventional email system.

FIG. 8 is a block diagram illustration of a conventional email system with anti-spam functionality. If a message sent by email senders 320 is not recognized by the anti-spam software update most recently updated from the spam reference library 420 it is forwarded to the email server 220 and thence to mailboxes either 222 or 252 or both.

Spammer senders have determined to modify their spam mail quicker than spam reference libraries can update and distribute their anti-spam software. By controlling large numbers of hijacked robots, a large volume of spam may be sent in a few hours or days.

Thus it can be appreciated that what is needed is a way to apply anti-spam software to email which has already passed through a spam filter into client mailboxes.

SUMMARY OF THE INVENTION

A highly efficient database is maintained for a brief period of time after an email is received, filtered, and transmitted to an email server. Message id, recipient, connecting IP address and other spam attributes are stored in a searchable format. After receiving updated spam attributes, a spam filter queries the database for messages that were not detected as spam before transmittal to the email clients and servers, and sends spam recall messages. Improved email clients and servers, move or modify email stored within user mailboxes upon receipt of the spam recall. In an embodiment, it is determined if the recipient has viewed or previewed the email and if not the email is deleted.

DETAILED DISCLOSURE OF EMBODIMENTS OF THE INVENTION

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

FIG. 1 shows a block diagram of a typical computing system 100 where the preferred embodiment of this invention can be practiced. The computer system 100 includes a computer platform having a hardware unit 103, that implements the methods disclosed below. The hardware unit 103 typically includes one or more central processing units (CPUs) 104, a memory 105 that may include a random access memory (RAM), and an input/output (I/O) interface 106. Microinstruction code 107, may also be included on the platform 102. Various peripheral components may be connected to the computer platform 102. Typically provided peripheral components include an external data storage device (e.g. flash, tape or disk) 110 where the data used by the preferred embodiment is stored. A link 112 may also be included to connect the system 100 to one or more other similar computer systems. The link 112 may also provide access to the global Internet. An operating system (OS) 114 coordinates the operation of the various components of the computer system 100, and is also responsible for managing various objects and files, and for recording certain information regarding same. Lying above the OS 114 is an applications and software tools layer 114A containing, for example, compilers, interpreters and other software tools. The applications 114A run above the operating system and enable the execution of programs using the methods known to the art.

An example of a suitable CPU is a Xeon™ processor (trademark of the Intel Corporation); examples of an operating systems is GNU/Linux; examples of an interpreter and a compiler are a Perl interpreter and a C++ compiler. Those skilled in the art will realize that one could substitute other examples of computing systems, processors, operating systems and tools for those mentioned above. As such, the teachings of this invention are not to be construed to be limited in any way to the specific architecture and components depicted in FIG. 1.

Figure 9:
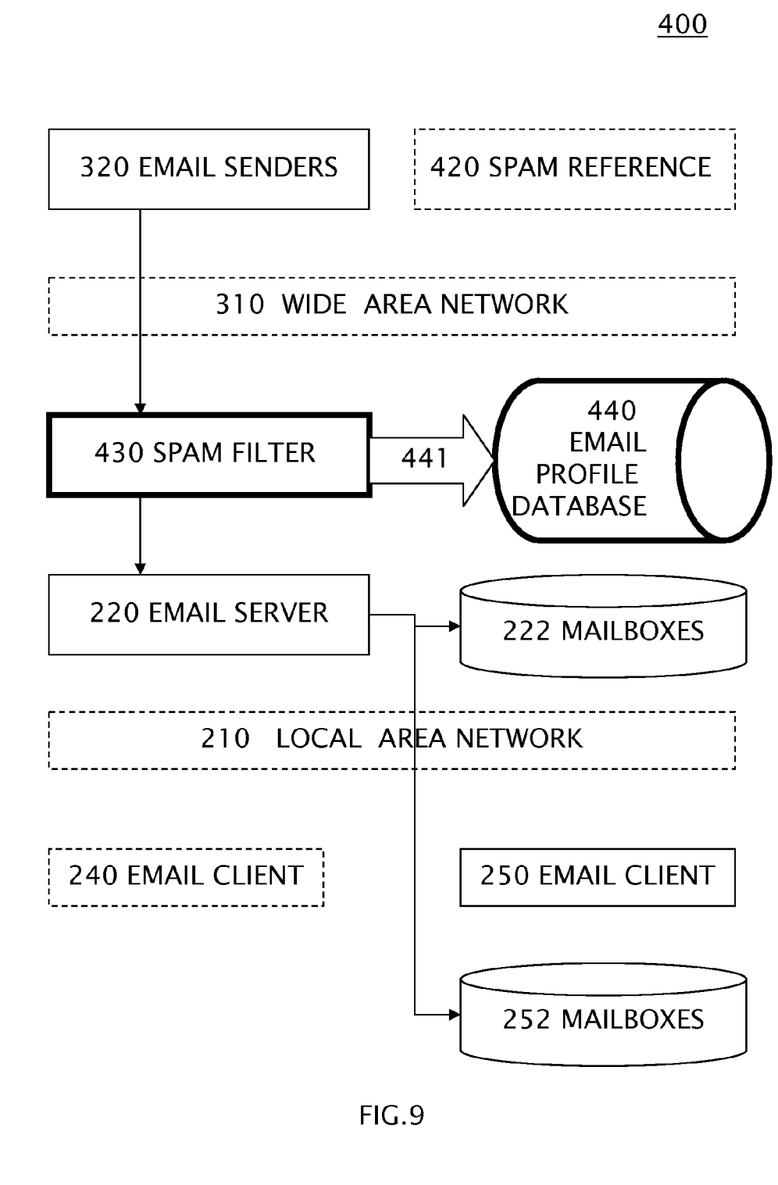
FIG. 9 shows a block diagram of the present invention.

FIG. 9 is a block diagram illustration of the present invention. Referring now to FIG. 9, a spam filter of the present invention 430 writes into an email profile database 440 which clearly distinguishes the present invention from conventional email systems. The spam filter reads each email and records a message ID, the connecting IP address and other useful information in a searchable database. In an embodiment the useful information includes the recipient. Other spam attributes are stored in an efficiently searchable format. Only a few hours or days of records are needed because the invention complements normal spam filtering. The email profile database is pruned to remove older records. Spam attributes include the sender address, the subject line, the hash values computed for attachments, a list of domains found in hypertext links, and may be updated by software received from the spam reference. The spam filter writes into the database searchable records 441 for each received email which it is transmitting to the email server and removes out of date records to make room. In an embodiment, the message ID is the Internet message ID assigned by a host. In an embodiment, such as when the host may not be trusted to maintain uniqueness among message IDs, the present invention prepends or appends additional fields to establish uniqueness. In an embodiment, the present invention generates its own message ID for the purpose of email recall. In an embodiment the present invention combines data from other attributes of the email to synthesis a message ID.

Figure 10:
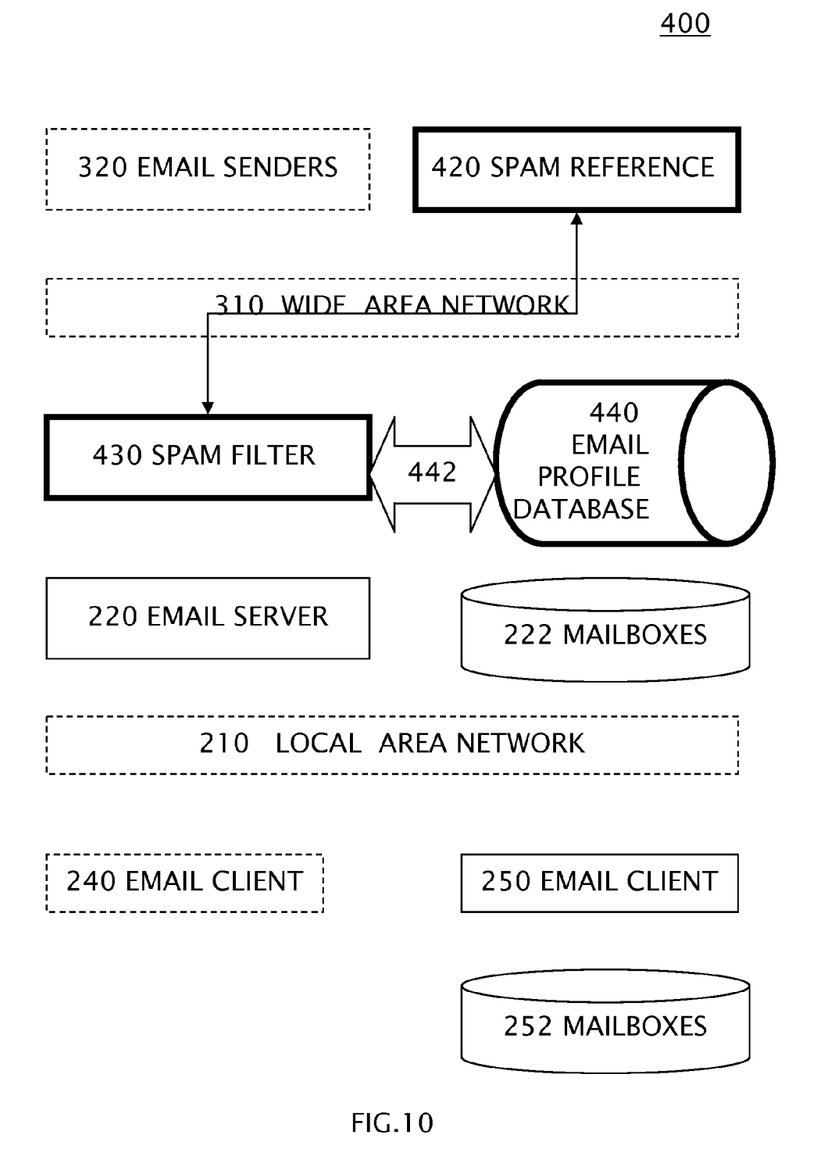
FIG. 10 shows a block diagram of the present invention.

FIG. 10 is a block diagram illustration of the present invention. In FIG. 10 the spam filter initiates a request for an update from the spam reference library. When new spam attributes are received, the spam filter queries the email profile database 440 for recently received emails which carry the spam attributes, and receives 442 the message id and in an embodiment, the recipient.

Figure 11:
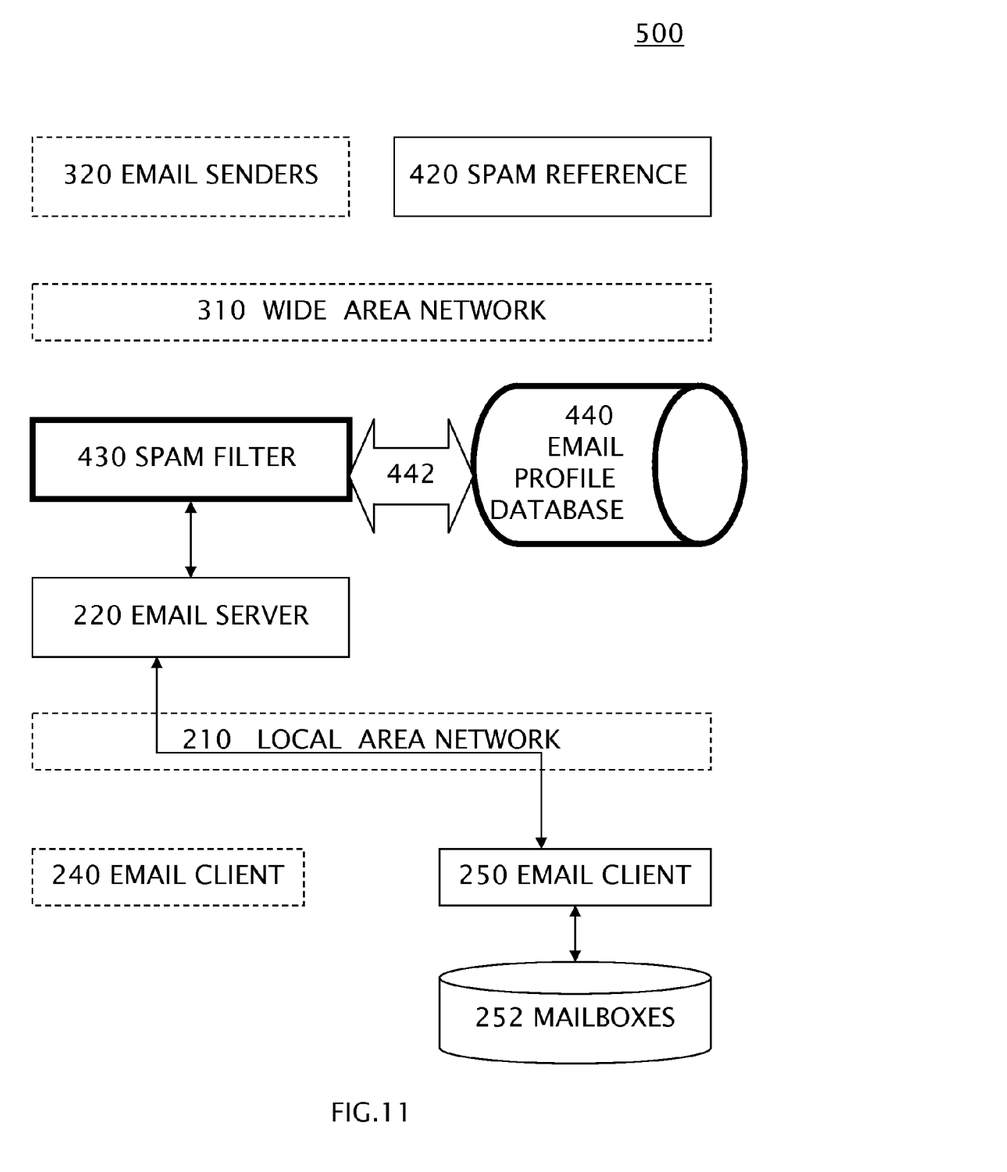
FIG. 11 shows a block diagram of recalling an email in the present invention.

FIG. 11 is a block diagram illustration of one embodiment of the present invention. FIG. 11 shows an email server of the present invention receiving a recall message for a specific recipient for a specific message id. An email client of the present invention 250 searches its attached email store 252 to recall the message. Recalling may mean modifying the message such as adding an icon or text, moving it to a junk or trash folder, changing the fonts or text of the sender, the subject, or the body of the message. An email client may comprise a circuit implemented by a processor controlled by an email client plug-in software to perform the operations herein specified.

Figure 12:
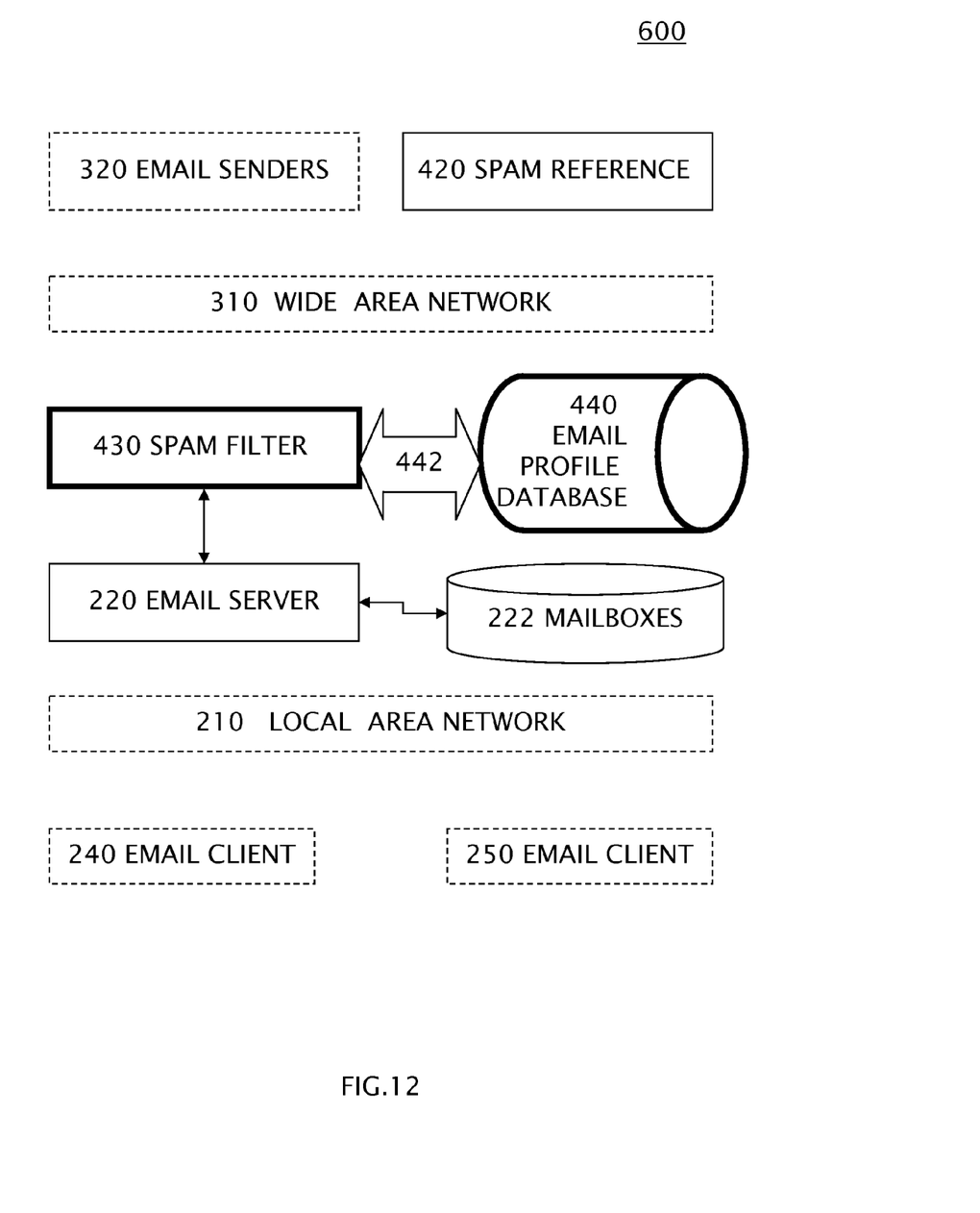
FIG. 12 shows a block diagram of recalling an email in the present invention.

FIG. 12 is a block diagram illustration of another embodiment of the present invention. FIG. 12 shows an email server of the present invention receiving a recall message for certain spam attributes or message ids. An email server of the present invention 220 searches all its attached email store 222 to recall any message in any mailbox having the spam attribute. Recalling may mean modifying the message such as adding an icon or text, moving it to a junk or trash folder, changing the fonts or text of the sender, the subject, or the body of the message. An email server may comprise a circuit implemented by a processor controlled by software to perform the operations herein specified through the api of the email server application.

Figure 13:
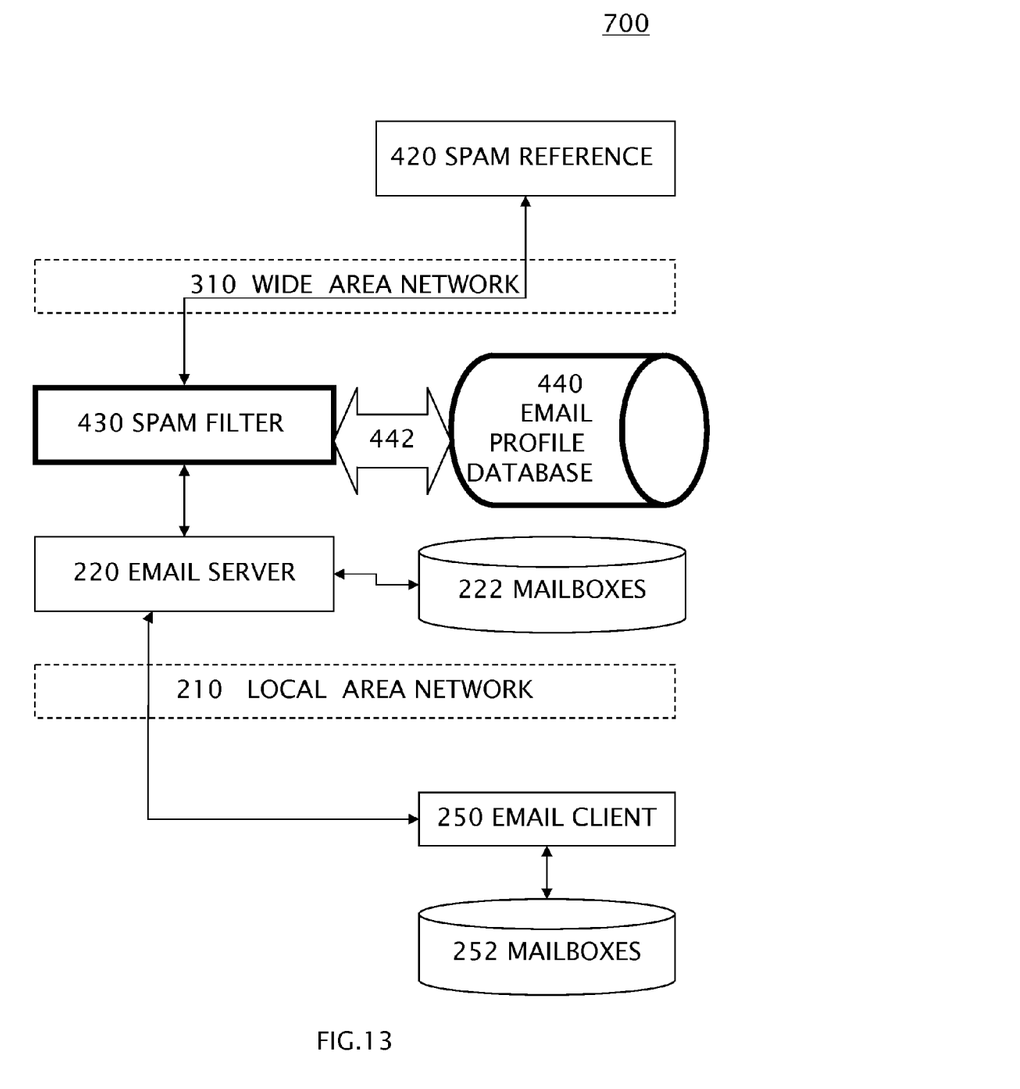
FIG. 13 shows a block diagram a best mode of the present invention.

FIG. 13 is a block diagram illustration of the best mode of the present invention. The bidirectional arrow between the spam filter 430 and the spam reference library 420 denote that the update of spam attributes is initiated by a request from the spam filter. The bidirectional arrow between the spam filter and the email profile database denotes that the spam filter writes attributes and messages ids into the database and later queries the database for message ids which have certain spam attributes. The bidirectional arrows between the spam filter and the email server denote that email is first transmitted and later recalled if an email matches a spam attribute. The bidirectional arrows between the email server and the email client or the mailboxes denote that certain messages having spam attributes or certain message ids are modified or moved in the recipients mailboxes.

The present invention is a method for operating an apparatus for recalling spam emails which have already been transmitted to email servers. The processes of the invention comprise:

Building a database of received email profiles;
Searching a database of email profiles to identify spam
wherein searching comprises
requesting an update of spam attributes from a spam reference, and
retrieving any message id having a match with a spam attribute; and
Recalling spam emails from mailboxes.

In an embodiment it is beneficial to add the process of retrieving a recipient of an email having a spam attribute. Exemplary non-limiting spam attributes include:
a connecting IP address,
a text string in the subject of an email,
a domain name in a hypertext link embedded in an email body,
a hash value computed on an attachment to an email, and
a "mail-from" field of the envelope of an email.

The present invention comprises an apparatus for searching a database of email profiles to identify spam comprising
a spam filter coupled to a wide area network,
the wide area network coupled to a spam reference apparatus,
the spam filter coupled to an email profile database,
wherein the email profile database comprises
reading and writing circuits for to read from and write to a computer readable media,
the computer readable media, and
a circuit to receive a query from a spam filter comprising a spam attribute, and
a circuit to reply to a spam filter with a message id if the spam attribute is found encoded on the computer readable media.

The spam filter comprises:
a network interface,
a circuit to request and receive an updated profile of spam attributes from a spam reference,
a circuit to query an email profile database with spam attributes and receive a message id if the spam attribute is found, and
a circuit to transmit a recall for message having a certain message id to an email server.

The spam reference apparatus comprises:
a network interface,
a circuit for receiving an update request from a spam filter,
a circuit for transmitting an updated profile of spam attributes, and
a circuit for reading a spam attribute store.

The process for building a database of received email profiles comprises:
receiving, reading an email, and forwarding it to an email server, and
storing a message id and connecting IP address for each email forwarded to an email server.

For efficiency the method above further comprising removing oldest records of email profiles. The purpose of the invention is to handle relatively new spam which has proliferated before a regularly scheduled update of a spam profile is distributed.

For each email it is efficient to store at least one email recipient. Additionally, in an embodiment, the method stores a spam attribute for each email as described above.

The apparatus for building a database of received email profiles comprises
a spam filter coupled to a wide area network, the spam filter further coupled to an email profile database,
wherein the spam filter comprises
a network interface,
a circuit to receive an email,
a circuit to read at least a message id and source ip address, and write into a searchable email profile database, and
a circuit to transmit the email to an email server.

The apparatus for building the database further comprises a circuit to write spam attributes into an email profile database wherein the email profile database comprises
reading and writing circuits for to read from and write to a computer readable media,
the computer readable media, and
a circuit to receive a record from a spam filter comprising a message id, a connecting IP address, a recipient, a spam attribute, and a time of receipt organized to be efficiently searchable and compact.

In an embodiment the method for recalling spam emails from mailboxes comprises transmitting a specific message id to a specific client for a specific client. In an embodiment the method for recalling spam emails from mailboxes comprises transmitting a specific message id to an email server. In an embodiment the method for recalling spam emails from mailboxes comprises transmitting a spam attribute to an email server. In an embodiment the method for recalling spam emails from mailboxes comprises deleting an unread message before it has been displayed to the user. In an embodiment the method for recalling spam emails from mailboxes comprises moving a message from one mailbox to another. In an embodiment the method for recalling spam emails from mailboxes comprises modifying at least one of the font, text, and icons of an email.

The apparatus for recalling spam emails comprises:
a circuit to receive a recall for a message having a certain spam attribute,
a circuit to search a file encoded on computer readable media for a certain spam attribute, and
a circuit to modify any file corresponding to a spam attribute encoded on computer readable media.

The apparatus for recalling spam emails comprises:
a circuit for to receive a recall for a message having a certain message id,
a circuit for to search a file encoded on computer readable media for a certain message id, and
a circuit for to modify a certain file corresponding to a message id encoded on computer readable media.

In an embodiment the apparatus for recalling spam emails comprises an email server for to support a plurality of email clients coupled to an email store whereby a spam email can be recalled for a plurality of message recipients. In an embodiment the apparatus for recalling spam emails comprises an email client to support a single email recipient whereby spam email can be recalled for a specific message to a specific recipient.

In an embodiment the method for recalling spam emails from mailboxes comprises transmitting a specific message id to a specific client for a specific client which triggers a process in the client to scan all emails in the inbox for a certain attribute.

In an embodiment the method for recalling spam emails from mailboxes comprises transmitting a specific message id to an email server which triggers a process in the server to scan all emails in all inboxes for a certain attribute.

In an embodiment the method for recalling spam emails from mailboxes comprises transmitting a specific message id to a specific client for a specific client which triggers a process in the client to upload selected attributes from all emails in an inbox to a special filter. In an embodiment, all source IP addresses are uploaded for filtering. In an embodiment, rescanning can be a background process. In an embodiment rescanning an inbox may be initiated when a screen saver is automatically started after inactivity.

In an embodiment the method for recalling spam emails from mailboxes comprises transmitting a specific message id to an email server triggering a process in the server to upload attributes from all emails in all inboxes to a special filter. In an embodiment hashes of all attachments are uploaded to a special filter. This filter may be a filter for viruses or a filter for spam. In an embodiment, an attachment containing a virus may be replaced with an attachment containing a warning message.

In an embodiment, the present invention comprises a circuit embedded within an email client which initiates a connection with the email profile database to request a list of spam or virus attributes. In an embodiment, the present invention comprises a circuit embedded within an email server which initiates a connection with the email profile database to request a list of spam or virus attributes. A non-limiting exemplary attribute is one of: a message id, a connecting IP address, a hash, an embedded domain name. Said connections may be scheduled, occur periodically, occur randomly, or occur upon a threshold of inactivity. In an embodiment, there is a different policy for recalling malicious email containing viruses and for recalling merely nuisance email containing spam wherein a policy is selected from a push and a pull. In an embodiment, a server or a client has a circuit to periodically check with a database of email profile database to determine if there is a "critical" update pending.

CONCLUSION

Because of the growth of botnets controlled by bad actors, there can be a massive distribution of spam and viruses before spam filters can be updated. The present invention provides the facility to recall email which have passed through filters prior to such an update into recipient's inboxes. A database is kept of recently passed emails, their recipients and characteristics of potential spam such as the connecting IP address in the email envelope. When a spam reference has new attributes, the database can be used to identify recipients, servers, clients, and message id's. In various embodiments, specific messages can be recalled or clients triggered to delete messages, or servers and clients directed to send their unexamined email for refiltering.

The above-described functions can be comprised of executable instructions that are stored on storage media. The executable instructions can be retrieved and executed by a processor. Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. An apparatus for searching a database of received email profiles to identify spam comprising
   a spam filter coupled to a wide area network, the wide area network coupled to
   a received email profile database, wherein the received email profile database comprises
      reading and writing circuits for to read from and write to a non-transitory computer readable media,
      the non-transitory computer readable media, and
      a circuit to receive a query from a spam filter comprising a connecting Internet Protocol (IP) address spam attribute, and
      a circuit to reply to a spam filter with a message id when the connecting Internet Protocol (IP) address spam attribute is found encoded on the computer readable media, wherein the connecting IP address is not a source IP address, not a sender address, and not a mail-from field value;
   wherein the spam filter is configured to search said received email profile database to identify spam by
   requesting an update of spam attributes from a reference,
   retrieving a message id having a match with one of the spam attributes, wherein the matched spam attribute comprises a connecting IP address;
   retrieving a recipient of an email having the matched spam attribute, and
   recalling the email having the matched spam attribute from the mailbox of the recipient by modifying at least one of a font, text, and icon of the spam email.

2. The apparatus of claim 1 wherein the spam filter comprises:
   a network interface,
   a circuit to request and receive an updated profile of spam attributes from a spam reference,
   a circuit to query a received email profile database with spam attributes and receive a message id when the connecting Internet Protocol (IP) address spam attribute is found, and
   a circuit to transmit a recall for a message having a certain message id to an email server.

3. The apparatus of claim 1 wherein the spam reference apparatus comprises:
   a network interface,
   a circuit for receiving an update request from a spam filter,
   a circuit for transmitting an updated profile of spam attributes, and
   a circuit for reading a spam attribute store.

4. A method for operating an improved spam filter apparatus for to recall spam email after transfer to an email server comprising:
   building a database of received email profiles;
   searching said database of received email profiles to identify spam, wherein searching comprises
   requesting an update of spam attributes from a reference,
   retrieving any message id having a match with a spam attribute;
   retrieving a recipient of an email having a spam attribute, wherein a spam attribute comprises a connecting IP address; and
   recalling a spam email having the spam attribute from the mailbox of the recipient by modifying at least one of a font, text, and icon of the spam email;
   wherein building a database of received email profiles comprises:
   receiving email,
   forwarding said email to an email server, and
   storing a message id and connecting IP address for each email forwarded to an email server, wherein the connecting IP address is not a source IP address, not a sender address, and not a mail-from field value.

5. The method of claim 4 further comprising
   removing oldest records of received email profiles from the database of received email profiles after an update to spam attributes has been received from a reference.

6. An apparatus for building a database of received email profiles comprises
   a spam filter coupled to a wide area network, the spam filter further coupled to a received email profile database, wherein the spam filter comprises
   a network interface,
   a circuit to receive an email,
   a circuit to read at least a message id, at least one connecting Internet Protocol (IP) address, and a source IP address, and write into a searchable received email profile database,
   a circuit to transmit the email to an email server, and a processor and memory,
   wherein the spam filter is configured to search said received email profile database to identify spam by
   requesting an update of spam attributes from a reference,
   retrieving a message id having a match with one of the spam attributes, wherein the matched spam attribute comprises a connecting IP address;
   retrieving a recipient of an email having the matched spam attribute, and
   recalling the email having the matched spam attribute from the mailbox of the recipient by modifying at least one of a font, text, and icon of the spam email.

7. The apparatus of claim 6 further comprising
   a circuit to write spam attributes into a received email profile database wherein the received email profile database comprises
   reading and writing circuits for to read from and write to a non-transitory computer readable media,
   the computer readable media, and a circuit to receive a record from a spam filter comprising a message id, a connecting IP address, a recipient, and a time of receipt organized to be efficiently searchable and compact.

* * * * *